United States Patent [19]

Hildreth

[11] 4,026,799

[45] May 31, 1977

[54] APPARATUS FOR REMOVING IMMISCIBLE SOLIDS AND LIQUIDS FROM A LIQUID

[76] Inventor: Edward C. Hildreth, 904 E. Main, Urbana, Ill. 61801

[22] Filed: Jan. 9, 1976

[21] Appl. No.: 647,874

[52] U.S. Cl. .................................. 210/84; 210/169; 210/532 R

[51] Int. Cl.² ........................................ B01D 23/00

[58] Field of Search .............. 210/83, 84, 167, 169, 210/513, 532 R, 532 S, 533, 536; 261/121 R; 209/143, 154, 209

[56] References Cited

UNITED STATES PATENTS 3,216,573  11/1965  Irion .......................... 210/532 R X Primary Examiner—Frank W. Lutter
Assistant Examiner—William A. Cuchlinski, Jr.

[57] ABSTRACT

Apparatus for removing immiscible solids and liquids from a liquid contaminated therewith including a tank for holding the contaminated liquid, a plurality of gas sparging elements adapted to introduce and distribute gas bubbles within the liquid in the tank, and baffling elements so constructed and positioned within the tank that the cooperative effect of the gas bubbles and the baffling autogenously sets up within the baffling a chamber through which liquid from the tank circulates in a clockwise direction and wherein immiscible solids and liquids in the circulating liquid may be removed by gravity. The apparatus, due to the inherent cleaning-promotion effects of the gas bubbles and the continuous internal contaminant removal, finds advantageous use in removing materials from liquids which themselves are simultaneously being utilized to clean difficult-to-clean objects, e.g., detergent solutions being used to clean permanent air filters for commercial-size air-conditioning systems and for grills, deep-fat fryers and stoves of restaurants.

8 Claims, 3 Drawing Figures

APPARATUS FOR REMOVING IMMISCIBLE SOLIDS AND LIQUIDS FROM A LIQUID

BACKGROUND OF THE INVENTION

This invention relates to an apparatus for cleaning liquids and, more particularly, for cleaning liquids which themselves simultaneously are being used to clean the surfaces of difficult-to-clean objects such as contaminated air filters from commerical-size s air-conditioning systems.

With the advent of twentieth century comfort living and the onset of air pollution standards, the installation and utilization in commercial and even private establishments such as apartment buildings, of air conditioning equipment has proliferated. Governmental control for safety purposes, furthermore, have become stricter with respect to removal of flamable, hazardous substances from exhaust fumes of units vented traditionally to the outside environment such as the exhaust fumes from ovens, stoves, grills and deep-fat fryers of restaurants. For economy purposes. the vast majority of units designed for commerical-sized air conditioning units and exhaust conditioning units are designed for use with replaceable permanent filters of the gas stream to be conditioned. Such permanent filters are constructed of the wide range of materials including for example aluminum, stainless steel, fiber glass, and other ceramics. In actual use, while the permanance of such filter elements has satisfied one basic economy requirement, for example, problems have arisen due to the fact that such filter elements periodically must be cleaned. This cleaning requirement is aggravated in practice by the nature of the contamination deposit build-up on the surfaces of cleaning elements by the combination of inorganic and organic solid particles and liquid droplets normally encountered over even relatively short periods of time, and the further human tendancey not to attend to the necessary removal and cleaning of such filtering elements until the contamination of dirt, dust and grime reaches such levels that the filtering capacity of the units is impaired.

Accordingly, an increasing need exists for suitable techniques for cleaning such filtering elements in an efficient relatively inexpensive manner. Cleaning techniques heretofore suggested for use in removing contaminants from such filtering elements, however, generally have not been even approaching being tolerable. Suggestions to employ conventional detergents have not been satisfactory due to the nature of the dust, grease, and grime contamination characteristically found on and in filters used in commercial air-conditioning and exhaust systems, nor has the use of such conventional detergents with a combined use of mechanically applied abrasion proved successful, since such proposed approaches do not achieve cleaning of the interior of a fouled filtering element. Most techniques previously suggested for cleaning such filtering elements, therefore, have had to resort to the use of harsh solvent liquids and solutions which attack organic matter, with the obvious serious drawback of presenting a safety problem to the operator handling such filtering elements in the cleaning eqipment employed, as well as to the environment of the cleaning equipment of itself. Such prior techniques, moreover, due to their characteristic disadvantages, have proven in practice to be useful only in achieving batch, wise operation.

Accordingly, the search has continued in the prior art for the development of a technique which is capable of efficiently and economically achieving removal of contaminants from filtering units conventionally employed in commercial air-conditioning and venting systems, and further capable of accomplishing such contaminant removal using conventional detergents which are non-harmful to human contact and adapted to attain such result in an essentially continually operating system.

OBJECTS OF THE PRESENT INVENTION

Accordingly, it is the primary object of the present invention to provide an improved method for cleaning difficult-to-clean solid surfaces.

A particular object of the present invention is to provide an efficient and inexpensive technique for effecting contaminant removal from the surfaces of filtering units normally employed in the commercial air-conditioning and venting systems.

Another particular object of the present invention is to provide an efficient, economical method adapted for cleaning contaminants from the surfaces of filtering elements normally employed in commercial air-conditioning and venting units which eliminates the need for cleaning solutions and solvents heretofore employed which are harmful when contacted by humans.

A further particular object of the present invention is to provide a commercially feasible method for cleaning contaminants from permanent filtering elements of commercial air-conditioning and venting systems which is capable of achieving the desired contaminant removal within a relatively short treatment times and is further capable of operating in an essentially continous manner.

Yet another particular object of the present invention is to provide an apparatus and method adapted to remove efficiently and economically immiscible liquids and solvents from contaminated aqueous and other solutions, e.g., for the removal of contaminants from fish bowls and aquariums.

DESCRIPTION OF THE DRAWINGS

The apparatus and method of the present invention will be more readily understood from the following detailed description thereof given with reference to the attached drawings of which.

Figure 1:
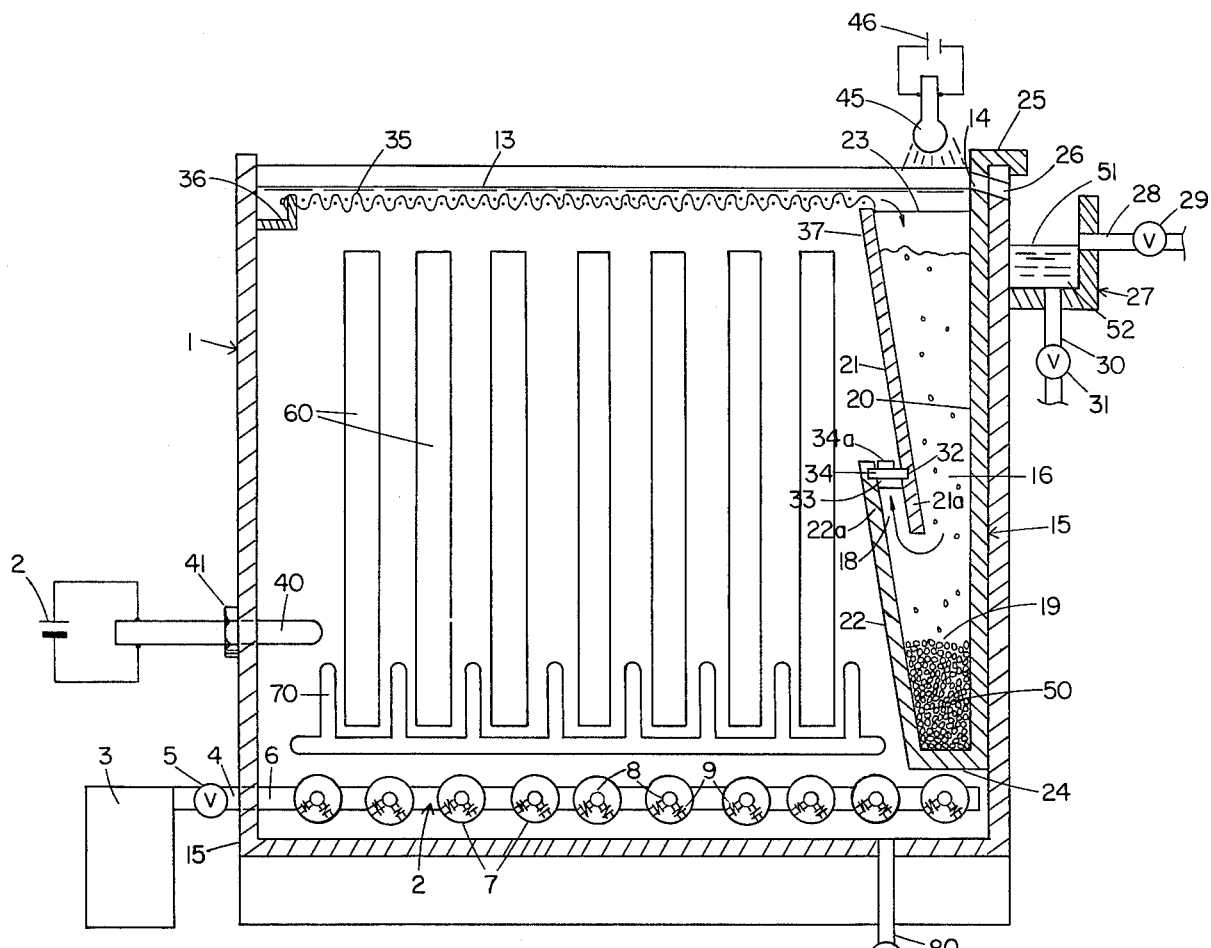
FIG. 1 is a front view of one embodiment of the apparatus of the present invention, taken in section, illustrating the apparatus as a cleaning device for removing contaminants from the surface of a plurality of solid objects and more particurlarly, permanent filtering elements of commercial-size air conditioning units.

Broadly described, in one aspect the present invention embodies a cleaning apparatus for removing particulate solids from autogenously circulating liquids comprising;

a. a housing for containing a reservoir of a liquid;

b. gas injection means, communicating with the interior of said housing, and adapted to introduce and distribute gas bubbles substantially uniformly throughout liquid within said housing; and
  c. baffle means forming
    1. a liquid circulation chamber having an inlet thereto and an outlet therefrom which open into the interior of said housing, said inlet and outlet being adapted to allow liquid to circulate from said housing into said chamber through said chamber, and from said chamber back into said housing,
    said inlet to said chamber being positioned at a greater height above the bottom of said housing than said outlet from said chamber,
    said outlet from said chamber being vertically baffled so as to be adapted not to allow gas bubbles formed and rising within liquid in said housing to enter said liquid circulation chamber through said outlet, whereby when gas bubbles are injected into liquid in said housing, liquid is caused autogenously to circulate from said housing and downwardly through said chamber, and
    said outlet from said chamber being positioned above the bottom of said chamber,
    2. within said liquid circulation chamber and positioned below said outlet from said circulation chamber, a zone, adapted to receive and collect particulate solids by gravity from liquid circulating through said chamber.

In another aspect the present invention provides and embodies a baffle element for use in removing solids from circulating liquids comprising a chamber having side walls forming an enclosure having two openings in verticle space relationship to each other, the lower of said two spaced openings being defined by two separate sections of a side wall of said chamber having upper and lower ends respectively which terminate adjacent to each other at a point intermediate the top and bottom of said chamber, said adjacent ends of said side wall sections overlapping one another in the verticle direction and being spaced from one another in the horizontal direction, and means positioned within said lower opening in said chamber adapted for slideable movement to vary the horizontal cross sectional area of said chamber lower opening.

With particular reference to the attached drawings the holding tank of the apparatus shown is designated generally 1 and tank 1 defines a chamber containing a liquid filling tank 1 to an upper liquid surface level 13. Gas sparger means 2 is positioned within tank 1 adjacent to its bottom and comprises, as shown more fully in FIG. 2, of manifold conduit means 6 to which a plurality of lateral conduit elements 7 are attached, each having an axial hollowed portion 8 and a plurality of orifices 9 in spaced relationship from one another transvers the length of conduit 7. A sufficient number of each lateral conduits 7 and orifices 9 are provided such that when compressed air is passed into the liquid in tank 1 by means of sparger means 2, as hereinafter described, the gas bubbles are distributed essentially uniformly throughout the liquid in tank 1.

A particular feature of the apparatus of the present invention is that orifices 9 of sparger 2 are directed and positioned such that at least a portion and preferably all, of the air bubbles injected into the liquid in tank 1 thereby are introduced in the liquid in a downward direction and contact the bottom of tank 1 thereby, with a self-cleaning effect, to preclude any undesirable build-up solids contaminate and the like in tank 1, and to preclude fouling of orifices 9 by solids when the apparatus is "down."

Advantage of the tank bottom self-cleaning effect of the present apparatus and method may also be utilized at start-up to remove any material from the tank bottom, thus reducing the down-time required in the use of the present invention for cleaning of the tank itself. The bottom-cleaning feature of the apparatus and method of the present invention also advantageously allows the present invention to be readily adapted for use in cleaning difficult-to-clean receptacles, per se, such as aquariums, boilers, and the like.

Figure 2:
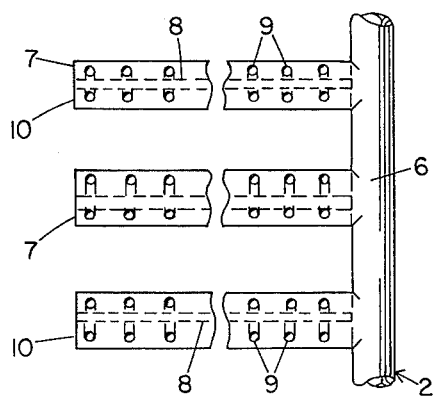
FIG. 2 is a bottom cutaway view of one embodiment of the compressed air sparging element employed in the apparatus of the present invention.
Figure 3:
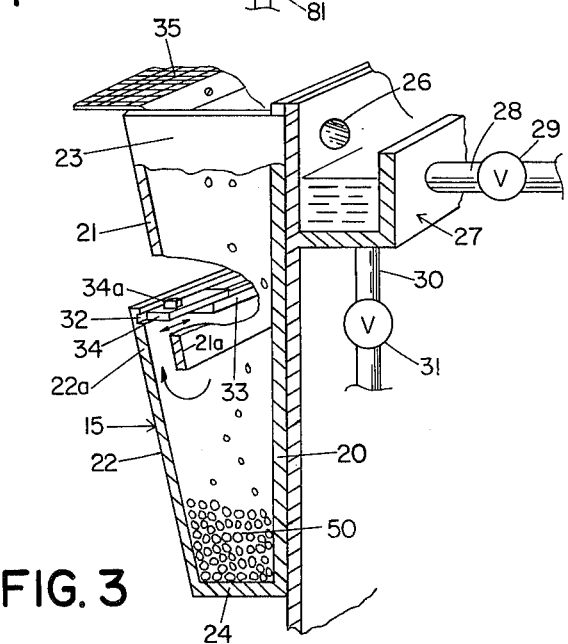
FIG. 3 is an enlarged view taken in perspective and in section of one embodiment of the baffling means of the apparatus of the present invention employed for removing immiscible solids and liquids from the contacting liquid employed.

As shown in FIGS. 1 and 2, in a more preferred design of the apparatus of the invention, the more desired sparging effect and gas distribution is achieved by lateral conduits 7 being provided with a plurality of rows of orifices 9 positioned whereby the respective axes of orifices 9 are in spaced relationship from one another, eg. in the range from about 90° to about 150° from each other.

In the apparatus of the present invention the sparger means is operatively connected to a source of compressed air which suitably may be in the form of bottled air under pressure, an air feed line adapted with a compressor or the like. In the embodiment shown in FIG. 1 sparger means 2 is operatively connected through hollow manifold 6, inlet line 4 and gas inlet valve means 5 with a compressed air source 3, shown generally, and lateral conduits 7 of sparger 2 are closed at their ends 10.

In the cleaning apparatus of the present invention, tank 1 is provided with a baffling means adapted to remove solids from liquid being treated in tank 1, during an autogenous circulation of the liquid being treated through the baffling means under the combined effects of injected and rising gas bubbles in the liquid and the design of the baffling means. In accordance with the present invention, such baffling means suitably may be provided by a baffled element separate and removable from tank 1 or by baffling elements integral with and being shaped at least partly from one of the side walls of tank 1.

In the embodiment of the cleaning apparatus of the present invention shown in the attached drawings, a baffling means 15 is provided which is separate and removable from tank 1, means 15 being further provided with suitable means, eg., hooked flange 25, for attachment to and positioning within the side walls of tank 1. As shown, baffling means 15 is a chamber formed by a back vertical side wall member 20, lateral vertical side wall members 23, bottom wall 24, and front vertical side wall sections 21 and 22. Baffling means 15 is open at its top, forming a liquid inlet, as described hereinafter. The lower end 21e of front side wall section 21, at a point intermediate the top and bottom of baffling means 15, terminates adjacent to and in a vertically overlapping relationship with the upper end 21a of front side wall section 22. The overlapping ends 21a and 22a of front vertical side wall sections 21 and 22, respectively, are further so positioned that end 22a is spaced horizontally from end 21a in a direction away from the interior 16 of baffling means 15, side wall sections 21 and 22 defining thereby an opening 18 therebetween which debauches from the interior 16 of baffling means 15 into the interior of tank 1 in an upward direction.

In the more preferred embodiments of the cleaning device of the present invention, means are provided in the lower (i.e., outlet) opening 18 of baffling means 15 for varying the horizontal cross-sectional area of opening 18. In the embodiment shown, for example, such means are provided comprising a spacer member 33 rigidly connected horizontally between ends 21a and 22a of front wall segments 21 and 22, respectively, with spacer element 33 having a length less than the distance between lateral side walls 23 of baffle means 15.

A plate 34 is positioned adjacent spacer element 33 and adapted for horizontal slideable movement within a notch 32 provided in front side wall segment 21. Plate 34 is provided with a vertical flange 34a by which force can be applied to plate 34 to slide plate 34 back and forth within slot 32 to vary the horizontal cross sectional area of opening 18.

The preferred embodiments of the cleaning device of the present invention are further provided with baffling means for removing and separating, from the liquid being cleaned, normally buoyant solids and liquids having a specific gravity less than that of the treating liquid. In the embodiment shown, such liquid separation means are provided by communicating slots 14 and 26 provided in rear wall 20 of baffle means 15 and the side wall of tank 1 adjacent back wall 20. Slots 14 and 26 are positioned adjacent the top of tank 1 at a height above the upper end 37 of front wall section 21 of baffle means 15. Tank 1, thus, may be filled with liquid to a level designated generally 13, and, at such a level 13, liquid on the surface at level 13 may pass through communicating slots 14 and 16, and liquid below level 13 may enter the opening provided in the top of baffle means 15. To collect liquid passing through slots 14 and 26, a collector housing means 27 is provided. Liquid collector means 27 suitably may be provided with separate outlets for removing treating liquid and lower specific gravity contaminant liquid such as outlet lines 30 and 28 provided with suitable valving means 31 and 29, respectively.

When used as a device for cleaning difficult-to-clean objects such as contaminated permanent air filters of commercial air-conditioning units, the apparatus of the present invention is operated as follows:

With compressed air feed inlet valve 5 in a closed position, objects to be cleaned 60 are placed in tank 1 either loosely or fitted within a supporting element 70 which may be similar to a conventional household dish drainer and which support element 70 may be a separate member simply inserted into tank 1 and laid loosely atop sparging means 2 or may be fixedly connected within tank 2 by suitable means (not shown). Tank 1 is then filled with a suitable cleaning liquid to a level indicated generally as 13 whereby elements 60 are immersed within the cleaning liquid and level 13 is above the upper end 37 of front side wall section 21 of baffle means 15.

The particular cleaning liquid employed suitably may be any aqueous or organic solvent-containing solution or dispersion which is inert with respect to the base material or materials of the cleaning apparatus and the to-be-cleaned objects 60. A particular feature of the present invention, however, is that, by means of the apparatus and method of the present invention, even difficult-to-clean objects, such as severely fouled, spun aluminum-or fiber glass-based permanent air filters from commercial-sized air-conditioning units, may be effeciently and rapidly, eg., within a cleaning period of from about 15 to about 40 minutes, essentially totally cleaned thereby, even when the cleaning liquid employed therein is a conventional household cleaning liquid safe for contact with human skin, eg., aqueous solutions of ammonia or alkyl aryl sulfates and sulfonates. Where desirable and to improve cleaning efficiency, a heating means 40 for the treating solution may be emersed within the cleaning liquid and provided with a suitable means for heating same such as an electrical source 42, shown generally.

To effect cleaning of contaminated elements 60, compressed air inlet valve 5 is then opened to allow compressed air to pass from a source of compressed air 3 into sparger means 2 and the lateral conduit elements 7 thereof. Compressed air is passed into sparger means 2 under sufficient pressure to effect the formation of air bubbles which issue from sparger means 2 through orifices 9 and become essentially uniformly distributed throughout the liquid in tank 1 and rise therein in sufficient numbers and with sufficient energy so as to agitate the cleaning liquid and cause the surface thereof 13 to become turbulent. For actual embodiments, the particular air pressures employed suitably may vary depending, upon inter alia, the treating liquid depth, the sizes of lateral conduit elements 7 and the number, size, and spacing of orifices 9. For particular embodiments of the cleaning device of the invention wherein lateral elements 7 consist of ⅜ inch outside diameter tubing having a 1/32 inch wall thickness, and orifices 9 provided thereon each have a diameter of 1/32 inch with a spacing of about ½ inch between individual orifices at a spacing between lateral members 7 of about 2 inch, air feed pressures in the range of from about 12 to about 20 psig are preferred for utilization at tank liquid depths ranging up to about 4 feet.

The resulting rising and agitating air bubbles and the agitated cleaning liquid, through their combined effect, cause removal of contaminant from the surfaces and interstices of objects 60 by a synergistic mechanical-chemical mechanism. In this mechanism, the cleaning liquid, through the constant agitation thereof by the air bubbles, exerts an enhanced solvent effect upon the contaminant present due to the contaminant concentration gradient across the contacting cleaning liquid interface being maintained at maximum levels. The agitating air bubbles function not only in this respect, and further as a means of conveying constantly loosened solid debris and immiscible liquid to the cleaning liquid surface 13, but further facilitates contaminant removal by degrading contaminant particles and molecules, per se by oxidizing same. As advantageous feature of the present apparatus and method is that, through the action of the bubbles, including the buoyancy, surface tension, and particle-phile properties thereof, both normally buoyant and normally non-buoyant solid particles may be forced to surface 13 for separation and removal from the system.

In addition to imparting buoyancy to contaminant solids and immiscible liquids removed from the surface of objects 60 and causing such contaminant solids and immiscible liquids to rise to the top 13 of cleaning liquid in tank 1, the injected and liquid-agitating bubbles rising in the liquid of tank 7 cooperate with the design of baffle means 15 to impart to the cleaning apparatus of the present invention an ability to effect removal of such contaminant and immiscible liquids from the cleaning liquid itself.

As injected bubbles rising in the liquid in tank 1 pass front wall lower section 21 in the area adjacent lower opening 18 of baffle means 15, the bubble-containing liquid forced upwardly in that area causes a slight reduction in the pressure existing in opening 18 as compared to the pressure, at a comparable liquid depth, existing within the interior of the baffle means 15. Such pressure differential causes liquid to be drawn and circulate from interior 16 of baffle means 15 to and through oulet 18 in a clockwise direction as shown by the arrow, which in turn effects a circulation of additional liquid from within tank 1 into the top opening or inlet of baffle means 15 in a similar clockwise direction as shown by the arrow. Continued operation of the sparging means 2, thus, established within baffling means 15 an upper chamber or zone 16 through which liquid from tank 1 circulates autogenously, the circulating liquid entering means 15 from the top, passing down therethrough and exiting therefrom through opening or outlet 18.

Due to the overlapping of ends 21a and 22a of front side wall member 21 and 22, respectively, the described clockwise circulation of liquid within baffling means 15 also establishes within baffling means 15 a lower chamber or zone 19, below circulation zone 16, in which liquid is relatively quiescent. In operation, queiscent zone 19 within baffling means 15 thus serves as a zone wherein normally non-buoyant solid particles, which were carried overhead in tank 1 by the surface effects of the rising bubbles and carried into circulation zone 16, are collected by gravity and removed from the system.

Similarly, the autogenously established circulation of liquid across the upper opening of baffling means 15 constantly draws normally buoyant (and some non-buoyant) contaminant solids and lighter immiscible liquids, eg., oils and grease droplets, on surface 13, to the opening defined by communicating slots 14 and 26 in baffling means 15 and the side wall of tank 1, respectively. At this opening, such buoyant solids and immiscible liquids intermittently may be caused to flow out of tank 1 by a "weir" effect and during surface level disturbances once liquid level 13 becomes established during continuous operation and after some run-off or leakage through slots 14 and 26 occurs immediately following start-up of air injection. Accordingly, cleaning liquid in the system continualy may be treated to remove and separate contaminant buoyant solids and immiscible liquids which collect during operation by gravity as a reservoir 51 in housing 27.

Although the apparatus and method of the present invention function suitably to achieve the desired cleaning effects when comprised and operated as described above, in the more preferred embodiments thereof additional means are provided for effecting a "fine tuning" of the rate and degree of the removal of contaminants, especially non-buoyant solids contaminants, by utilizing means for controling the rate at which liquid circulates through chamber 16 of baffling means 15. One technique involves merely adjusting the air inlet pressure. In the embodiment shown, this feature also is achieved by adjusting, during operation of the system at a given air injection pressure, the relative horizontal position of plate 34 in outlet 18 of baffle means 15. By moving plate 34 to a position whereby it either increases or decreases the horizontal cross sectional area of opening 18, one may decrease and increase, respectively, the liquid flow rate through baffle chamber 16 and, through such "back-pressure" control on outlet 18 of baffling means 15, achieve such an adjustment of liquid circulation through baffle chamber 16 where essentially all solids entering chamber 16 ultimately are deposited in collection chamber 19 and none re-escapes through outlet 18. Although the specific embodiment of such a back-pressure means includes one that is variable, it will be readily understood that systems designed to operate at set constant conditions of gas pressure, tank 1 liquid composition and depth, etc. suitably may be provided with a back-pressure member similar to plate 34 which is fixedly connected in opening 18.

In some instances, such as those wherein a relatively large amount of lighter immiscible liquid material comprises a portion of the contaminant being separated, separation of such immiscible liquid from level 13, with minimal losses of treating liquid may be improved by providing means which increases the quiesence of liquid in the region of surface 13. An embodiment of such means, as shown, includes a screen 35 which may be supported below an adjacent level 13 such as at one end by a support bracket 36 adjacent one wall tank 1 and at the other end by the upper end 37 of front wall section 21 of baffle means 15.

For applications of either treating liquids, per se, for contaminant removal, or of effecting contaminant removal from solid objects, wherein sanitation standards must be observed, eg., in cleaning the carcasses of fowl such as chicken, ducks, turkeys, and the like, the apparatus and method of the present invention embody the use of means such as a source of UV light 45 which, due to the autogenous circulation features of the present apparatus and method, simply need be positioned above the top inlet of baffling means 15 to achieve the desired control of microbes within the entire system.

For emptying, tank 1, where desirable, suitably may be provided with a flushing outlet 80, having an outlet valve 81.

What is claimed is:
1. A cleaning apparatus for removing particulate solids from autogenously circulating liquids comprising:
   a. a housing for containing a reservoir of a liquid;
   b. gas injection means, communicating with the interior of said housing, and adapted to introduce and distribute gas bubbles substantially uniformly throughout liquid within said housing, said gas injection means including a gas sparging element positioned adjacent the bottom of said housing and having a plurality of perforated lateral elements in spaced relationship to one another, said perforations in said lateral elements consisting of gas outlet orifices for gas injection into said housing; and
   c. baffle means forming
      1. a liquid circulation chamber having an inlet thereto and an outlet therefrom which open into the interior of said housing, said inlet and outlet being adapted to allow liquid to circulate from said housing into said chamber through said chamber, and from said chamber back into said housing,
      said inlet to said chamber being positioned at a greater height above the bottom of said housing than said outlet from said chamber.
      said outlet from said chamber being vertically baffled so as to be adpated not to allow gas bubbles formed and rising within liquid in said housing to enter said liquid circulation chamber through said outlet, whereby when gas bubbles are injected into liquid in said housing, liquid is caused autogenously to circulate from said housing and downwardly through said chamber, and said outlet from said chamber being positioned above the bottom of said chamber, 2. within said liquid circulation chamber and positioned below said outlet from said circulation chamber, a zone, adapted to receive and collect particulate solids by gravity from liquid circulating through said chamber.

2. A cleaning apparatus according to claim 1 wherein said baffle means is separate and removable from said housing.

3. A cleaning apparatus according to claim 1 wherein the axes of said gas outlet orifices extend in a direction toward the bottom of said housing, whereby gas bubbles formed by gas injection into liquid in said housing are adapted to contact said bottom of said housing.

4. A cleaning apparatus according to claim 1 comprising baffle means for separating and removing from said housing the lighter of two immiscible liquids contained in said housing, said liquid separation baffling means including an opening in a side wall of said housing.

5. A cleaning apparatus according to claim 1 wherein supplemental baffle means are positioned within said outlet from said circulation chamber of said baffling means, to restrict the flow of liquid through said outlet.

6. A cleaning apparatus according to claim 5 wherein said supplemental baffle means, within said circulation chamber outlet is adapted for variable positioning to thereby vary the flow of liquid through said outlet.

7. A baffle element for use in removing solids from circulating liquids comprising a chamber having side walls forming an enclosure having two openings in verticle space relationship to each other, the lower of said two spaced openings being defined by two separate sections of a side wall of said chamber having upper and lower ends respectively which terminate adjacent to each other at a point intermediate the top and bottom of said chamber, said adjacent ends of said side wall sections overlapping one another in the vertical direction and being spaced from one another in the horizontal direction, and means positioned within said lower opening in said chamber adapted for slideable movement to vary the horizontal cross sectional area of said chamber lower opening.

8. A method for treating a solids-containing a liquid within housing to effect removal of said solids from said liquid comprising 1. injecting a gas into said liquid to form and distribute gas bubbles substantially uniform throughout said liquid, 2. causing liquid in said housing to communicate with both openings of a baffle element comprising a chamber having side walls forming an enclosure having two openings in vertical spaced relationship to each other, the lower of said two spaced openings being defined by two separate sections of a side wall of said chamber having upper and lower ends respectively which terminate adjacent to each other at a point intermediate the top and bottom of said chamber, said adjacent ends of said side wall sections overlapping one another in the vertical direction and being spaced from one another in the horizontal direction, and means positioned within said lower opening in said chamber adapted for slideable movement to vary the horizontal cross sectional area of said chamber lower opening, whereby said liquid is caused autogenously to circulate from said housing into the said upper opening in said baffle element, then downwardly through said baffle element, and into said housing through said lower opening in said baffle element, and 3. collecting solids by gravity in an essentially quiescent zone in said baffle element at a point below said lower opening of said baffle element.

* * * * *